3,116,318
PREPARATION OF ALIPHATIC NITRILES BY CATALYZED REACTION OF CYANOGEN OR HYDROGEN CYANIDE WITH HALOGENATED ALIPHATIC HYDROCARBON
William L. Fierce, Crystal Lake, and Walter J. Sandner, Carpentersville, Ill., assignors to The Pure Oil Company, Chicago, Ill., a corporation of Ohio
No Drawing. Filed Nov. 18, 1960, Ser. No. 70,122
15 Claims. (Cl. 260—465.1)

This invention comprises a new and improved process for the preparation of aliphatic nitriles by reaction of a low-molecular-weight, halogenated aliphatic hydrocarbon with cyanogen or hydrogen cyanide at a temperature from about 400° to 1000° C. in the presence of a catalyst consisting essentially of activated alumina.

In our previous Patent 2,802,020, we have disclosed a process for the preparation of acetonitrile by the reaction of methane with cyanogen at temperatures of 700°–1200° C. In Patent 2,809,987, we have disclosed a process in which ethane and cyanogen are reacted at temperatures above 700° C. to produce ethylene and acrylonitrile as products. In Patent 2,803,642, we have disclosed a process in which cyanogen and olefins are reacted at 700°–1000° C. to produce aliphatic nitriles. In our co-pending application Serial No. 808,911, filed April 27, 1959, now U.S. Patent 3,057,906, we have disclosed a process in which aliphatic nitriles are prepared by reaction of alkanes or alkenes with cyanogen or hydrogen cyanide at temperatures of 475–1000° C., in the presence of a group VIII noble-metal-containing catalyst.

It is one object of this invention to provide a new and improved method for the preparation of aliphatic nitriles.

Another object of this invention is to provide an improved method for the preparation of aliphatic nitriles by reaction of low-molecular-weight, halogenated aliphatic hydrocarbons with cyanogen or hydrogen cyanide in the presence of a catalyst.

A feature of this invention is the provision of an improved process for the reaction of halogenated aliphatic hydrocarbon (e.g., $CH_3X$, $C_2H_4X_2$, $C_2H_3X$, and $$CH_2CHCH_2X$$

where X is halogen) with hydrogen cyanide or cyanogen at a temperature of about 400°–1000° C., in the presence of a catalyst.

Another feature of this invention is the provision of an improved process for the reaction of a halogenated, aliphatic hydrocarbon (e.g., $CH_3X$, $C_2H_4X_2$, $C_2H_3X$, and $CH_2CHCH_2X$, where X is halogen) with cyanogen or hydrogen cyanide in the presence of a catalyst consisting essentially of alumina at temperatures of about 400°–1000° C.

Other objects and features of this invention will become apparent from time to time throughout the specification and claims as hereinafter related.

In accordance with our invention, a mixture of one or more halogenated, aliphatic hydrocarbons of the group consisting of $CH_3X$, $C_2H_4X_2$, $C_2H_3X$, , where X is halogen, and cyanogen or hydrogen cyanide are mixed and heated to a temperature in the range from about 400° to 1000° C. (preferably 450°–600° C.) in contact with a catalyst consisting essentially of alumina (preferably activated alumina) or alumina containing a small amount of a group VIII noble metal. Under these reaction conditions, a reaction takes place in which a cyano or nitrile group is substituted for one of the halogens on the halogenated aliphatic hydrocarbon. In carrying out this reaction, it is necessary that the halogenated hydrocarbon reactant be limited to the above-named halogenated hydrocarbons, since halogenated higher aliphatic hydrocarbons are dehydrohalogenated by the catalyst under the reaction conditions, and no exchange reaction takes place with the cyanogen or hydrogen cyanide. When a halogenated higher hydrocarbon is used as a reactant, some nitriles may be formed, but the product is not the result of substitution of a nitrile group for a halogen; instead, it is a product of the reaction of cyanogen or hydrogen cyanide with the unsaturated hydrocarbon which results from dehydrohalogenation of the halogenated hydrocarbon. The halogenated hydrocarbons which are effective in this process have the general formula $CH_3X$, $C_2H_4X_2$, $C_2H_3X$, and $CH_2CHCH_2X$, where X is a halogen, such as chlorine, bromine, or iodine. Reactants which fall within these general formulae, and are operative in this process, include methyl chloride, methyl bromide, methyl iodide, allyl chloride, allyl bromide, allyl iodide, ethylene dichloride, ethylene dibromide, ethylene diiodide, 1,2-chlorobromoethane, vinyl chloride, vinyl bromide, vinyl iodide. This reaction proceeds well at atmospheric pressure, although it may be carried out at either subatmospheric or superatmospheric pressures. In the temperature range from about 400° to 1000° C., substantial yields of aliphatic nitriles are obtained, while no such nitriles are produced in the absence of the catalyst. At higher temperatures within this range, the yield of nitriles decreases somewhat, but the catalyst is still effective in promoting the reaction of the above-identified halogenated hydrocarbons with cyanogen or hydrogen cyanide. In order to increase the yield per pass of the nitrile, based on the cyanogen or hydrogen cyanide charged, we prefer to use a molar excess of the halogenated hydrocarbon. Although we prefer to use a mol ratio for halogenated hydrocarbon to cyanogen or hydrogen cyanide in the range from about 2–10/1, the mol ratio may vary widely as, for example, from 1–20 mols of the halogenated hydrocarbon to 20–1 mols of the cyanogen or hydrogen cyanide.

The reactant gases in this process may be passed through the reaction zone at a gaseous hourly space velocity of approximately 50 to 2000, but we prefer to operate our process at a space velocity of approximately 200–700. Space velocity as used herein is defined as the ratio of the volume of gases at standard temperature and pressure charged per hour to the volume of the reaction space. In carrying out our process, the cyanogen or hydrogen cyanide and the halogenated hydrocarbon may be either premixed and preheated, or may be separately charged to the reaction zone maintained at the desired reaction temperature. If desired, the reactants may be mixed with an inert diluent gas, such as hydrogen, helium, nitrogen, etc. Any type of reaction zone may be used which is resistant to corrosion or attack by the reactants or reaction products, including such materials as quartz, high-silica glass, and stainless steel. The reaction zone may be heated electrically, or by combustion gases applied externally or through heating tubes placed within the reactor, or the reaction zone may be filled with hot refractory pebbles, which are intermittently heated to the desired temperature.

When cyanogen is used as one of the reactants, the reaction effluent from the reactor comprises one or more aliphatic nitriles produced in the reaction, hydrogen cyanide, hydrogen halide, cyanogen halide, and unconverted halogenated hydrocarbon and/or cyanogen, as well as small amounts of other by-products. When hydrogen cyanide is one of the reactants, the reaction effluent contains hydrogen, aliphatic nitriles, hydrogen halide, unconverted halogenated hydrocarbon, and/or hydrogen cyanide, as well as small amounts of other by-products. In either embodiment of the process, the reaction effluent is cooled to a temperature sufficiently low to condense the aliphatic nitrile product, which can then be separated by fractionation to obtain substantially pure nitriles there-from. Where hydrogen cyanide is a reaction by-product, it may be recovered and purified and used for further reaction in this process, or may be converted by a suitable partial oxidation process to cyanogen. Any unreacted hydrogen cyanide, cyanogen, or halogenated hydrocarbons, can be recycled to the reaction zone in admixture with fresh charge gases so as to convert them to further quantities of aliphatic nitriles.

The following non-limiting examples are illustrative of the scope of the invention.

EXAMPLE I

A series of experiments were carried out using an electrically heated Vycor (high-silica glass) tube as the reactor. The reactor tube was charged with a granular catalyst consisting of either activated alumina or 0.5% wt. rhodium on activated alumina, which had been predried at about 500°–600° C. for about 17 hours. In these experiments, a gaseous mixture of hydrogen cyanide and methyl chloride, together with helium diluent, was charged at atmospheric pressure to the catalyst bed in the electrically heated Vycor tube. In each experiment, the effluent gases from the reaction zone were passed through a water condenser. Liquid products were identified by infra-red analysis, while gas samples of the charge gases and product gases (taken after the gas had passed through the condenser) were analyzed by the mass spectrometer. In Table I, there are set forth the results of this series of experiments using activated alumina and rhodium on activated-alumina catalysts under different conditions of temperature.

*Table I*

| Run No. | A | B | C | C | D |
|---|---|---|---|---|---|
| Temperature (°C.) | 457 | 553 | 673 | 518 | 612 |
| Mol Ratio of CH$_3$Cl/HCN | 2.87 | 2.72 | 2.73 | 2.76 | 2.96 |
| Gaseous Hourly Space Velocity of Total Charge Gas | 564 | 560 | 552 | 461 | 498 |
| Time (min.) | 36 | 52 | 25 | 30 | 30 |
| Percent HCN Consumed | 52.0 | 69.0 | 42.2 | 85.3 | 54.4 |
| Percent CH$_3$Cl Consumed | 23.9 | 74.2 | 99.9 | 36.1 | 96.9 |
| Acetonitrile Yields, Yield Per Pass: | | | | | |
| Based on HCN | 33.8 | 80.2 | 25.8 | 73.6 | 38.7 |
| Based on CH$_3$Cl | 11.8 | 29.5 | 9.5 | 26.7 | 13.0 |
| Selectivity: | | | | | |
| Based on HCN | 65.3 | 116 | 61.2 | 86.7 | 71.2 |
| Based on CH$_3$Cl | 49.4 | 39.7 | 9.5 | 73.8 | 13.4 |
| Catalyst Used | Alumina (F-10) | | | 0.5% Rhodium on Alumina | |

In our experiments, it was found that the optimum temperature range for the reaction is about 500°–600° C. Very little reaction occurs at temperatures below about 400° C. and at temperatures above 600° C., increasing amounts of by-products are formed. The major by-products are methane and hydrogen chloride, together with other decomposition products.

Our experimental data seem to indicate that there is no substantial difference between activated alumina and activated alumina promoted with a platinum group metal (e.g., up to 5% wt.) when used as the catalyst in the reaction with methyl halides. In carrying out this process, the mol ratio of the halogenated hydrocarbon to hydrogen cyanide may vary widely, e.g., from about 0.1 to 10 mols of halogenated hydrocarbon per mol of hydrogen cyanide. The gaseous hourly space velocity of reactants may vary in the range from as low as 50 to as high as 2000, or more, a range of 200–700 being preferred.

EXAMPLE II

In another series of experiments, the gas-phase reaction of cyanogen with halogenated hydrocarbon was investigated. A series of experiments was carried out using an electrically heated Vycor (high-silica glass) tube as the reactor. The reactor tube was charged with a granular catalyst consisting of activated alumina or 0.5% wt. rhodium on alumina, which had been predried at 500°–600° C. for about 17 hours. In these experiments, a gaseous mixture of cyanogen, methyl chloride, and helium diluent was charged at atmospheric pressure to the catalyst bed in the electrically heated Vycor tube. The effluent gases from the reaction zone were passed through a water condenser. Liquid products were identified by infra-red analysis, while gas samples of the charge gas and the product gases (taken after the gas had passed through the condenser) were analyzed by the mass spectrometer. In Table II, there are set forth the results of a series of experiments at different temperature conditions using a rhodium-on-alumina catalyst for effecting the reaction of methyl chloride and cyanogen to produce acetonitrile. In addition to the products indicated in the table, by-products are obtained which include methane, hydrogen cyanide, hydrogen chloride, and cyanogen chloride.

*Table II*

REACTIONS CATALYZED BY RHODIUM ON ALUMINA

| Run No. | A | B | C | D |
|---|---|---|---|---|
| Gaseous Hourly Space Velocity of Total Charge Gas | 482 | 492 | 487 | 494 |
| Temperature (° C.) | 393 | 526 | 560 | 650 |
| Time (Min.) | 30 | 30 | 20 | 30 |
| Mol Ratio of CH$^3$Cl/(CN)$_2$ | 1.95 | 1.63 | 2.38 | 2.46 |
| Reactant Conversions: | | | | |
| Percent Cyanogen | 3.5 | 99.4 | 100 | 100 |
| Percent Methyl Chloride | (¹) | 85.6 | 94.8 | 99.5 |
| Acetonitrile Yields:² | | | | |
| Percent Molar Yield per Pass | 4.9 | 71.8 | 51.4 | 38.8 |
| Percent Molar Selectivity | 139 | 72.4 | 51.4 | 38.8 |

¹ The conversion of methyl chloride was very small and could not be measured accurately in Run A.
² The molar yield per pass is defined as the mols of the indicated product formed, expressed as a percentage of the mols of cyanogen charged. The molar selectivity is a similar percentage based upon the mols of cyanogen consumed.

In Table III, there are set forth the results of similar runs using activated Alumina as the catalyst.

*Table III*

REACTION OF (CN)$_2$ AND CH$_3$Cl IN PRESENCE OF ACTIVATED ALUMINA

| Run No. | A | B | C | D |
|---|---|---|---|---|
| Gaseous Hourly Space Velocity of Total Charge Gas ¹ | 446 | 482 | 494 | 494 |
| Temperature (° C.) | 565 | 665 | 412 | 516 |
| Mol Ratio of CH$_3$Cl/(CN)$_2$ | 2.98 | 1.97 | 2.54 | 2.54 |
| Reactant Conversions: | | | | |
| Percent Cyanogen | 100 | 99.7 | 7.9 | 83.5 |
| Percent Methyl Chloride | 96.5 | 99.8 | 5.5 | 63.1 |
| Acetonitrile Yields:² | | | | |
| Percent Molar Yield per Pass | 127.3 | 92.3 | 3.5 | 68.8 |
| Percent Molar Selectivity | 127.3 | 92.6 | 44.1 | 82.5 |

¹ Charge gas includes 25% vol. helium diluent.
² Selectivity and yields are calculated as in Table II.

In our experiments, we have found that in the absence of a catalyst, there is substantially no reaction between cyanogen and methyl chloride, even at very high temperatures. At temperatures above 750° C., there is a substantial conversion of both methyl chloride and cyanogen, but only minute amounts of acetonitrile are formed. In the presence of the activated alumina or rhodium-on-activated-alumina catalyst, very little reaction occurs below 400° C. and for all practical purposes, the range of the reaction lies between 400° and 1000° C. The optimum yield of acetonitrile occurs at 500°–600° C. At higher temperatures, increasing amounts of by-products form, principally methane, hydrogen cyanide, hydrogen chloride, and cyanogen chloride.

EXAMPLE III

In another series of experiments, cyanogen and/or hydrogen cyanide were heated with other halogenated hydrocarbons in an attempt to prepare nitriles. The reaction conditions and results are reported in Table IV, below.

Table IV

| Run No. | 1 | 2 | 3 | 4 | 5 | 6 |
|---|---|---|---|---|---|---|
| Catalyst | B | B | A | A | A | B |
| Reactants | $C_2H_3Cl_2$ $(CN)_2$ | $C_2H_3Cl_2$ $(CN)_2$ | $CH_2CHCH_2Cl$ HCN | $CH_2CHCl$ HCN | $CH_2CHCl$ HCN | $CH_2Cl_2$ $(CN)_2$ |
| Temperature (°C.) | 466 | 558 | 480 | 455 | 565 | 578 |
| Duration of Run (Min.) | 53 | 30 | 40 | 30 | 30 | 24 |
| Mol Ratio of $(CN)_2$ or HCN to Halide | 3.2 | 3.3 | 0.71 | 1.35 | 1.50 | 1.66 |
| Gaseous Hourly Space Velocity | 663 | 622 | 550 | 694 | 698 | 609 |
| Percent $(CN)_2$ or HCN Consumed | 15.5 | 25.2 | 75.2 | 7.3 | 21.1 | 45.8 |
| Percent Halide Consumed | 31.0 | 72.0 | 98.7 | 13.3 | 84.4 | 99.6 |
| Product Nitrile | $CH_2CHCN$ | $CH_2CHCN$ | $CH_2CHCH_2CN$ | $CH_3CN$ | $CH_3CN$ | |
| Percent Yield Per Pass [1] | 0.0 | 65.7 | 8.7 | 2.4 | 23.2 | 0.0 |
| Percent Selectivity [1] | 0.0 | 91.3 | 11.6 | 18.2 | 27.4 | 0.0 |

[1] Based on the limiting reactant.
A—Activated alumina.
B—0.5% Rhodium on activated alumina.

From the data set forth in Table IV, it is seen that ethylene dichloride, vinyl chloride, and allyl chloride react with cyanogen or hydrogen cyanide to yield nitriles. Methylene chloride does not yield nitriles under similar reaction conditions. In additional runs in which only qualitative data were obtained, we were unable to produce nitriles by reaction of chlorobutane, bromobutane, or benzyl chloride with cyanogen or hydrogen cyanide using the catalysts or reaction conditions described above.

EXAMPLE IV

In other experiments we have found that the reaction of an ethylene dihalide or a vinyl halide with hydrogen cyanide or cyanogen to produce acrylonitrile requires the use of a group VIII noble metal-containing catalyst. When this reaction is carried out using a refractory catalyst such as activated alumina containing no noble metal, the product of reaction is acetonitrile.

In a series of experiments carried out using the reactor and reaction conditions described in Example I, vinyl chloride and hydrogen cyanide were reacted in the presence of a catalyst consisting of 0.5% wt. rhodium on alumina. The first run was carried out at hydrogen cyanide/vinyl chloride mol ratio of 1.31 at a reaction temperature of 454° C., and a gaseous hourly space velocity of 662 for a period of 40 minutes. In this run the hydrogen cyanide was consumed to the extent of 20.4% and vinyl chloride was consumed to the extent of 19.8%. Acetonitrile was obtained in the amount of 12.1%, acrylonitrile in the amount of 16.8%, and propionitrile in the amount of 4.1%, based on the vinyl chloride consumed in the reaction.

In another run, hydrogen cyanide and vinyl chloride in a mol ratio of 1.23 were passed over a 0.5% rhodium on alumina catalyst for 40 minutes at a gaseous hourly space velocity of 720 and reaction temperature of 560° C. In this run, 31.7% of the hydrogen cyanide and 74.3% of the vinyl chloride were consumed. In this run, there was obtained 12.4% of acetonitrile, 6.5% acrylonitrile, and 5.5% of propionitrile, based on the vinyl chloride consumed in the reaction. From these experiments and other experiments carried out on the reactions of vinyl halides and ethylene dihalides, we have found that the use of a noble metal-containing catalyst is necessary where acrylonitrile is the desired product. When a refractory catalyst, such as activated alumina, is used in the reaction, substantially no acrylonitrile is formed, although there is a substantial yield of acetonitrile. In runs where acryonitrile is the desired product, the catalyst used consists of alumina containing about 0.01–5% of a group VIII noble metal. In this catalyst, any of the platinum group metals: platinum, palladium, rhodium, iridium, ruthenium, and osmium, may be used, either singly or in combination.

In our process, the proportions of halogenated hydrocarbon and cyanogen (or HCN) are not critical and the mol ratio of halogenated hydrocarbon to cyanogen (or HCN) may vary from about 0.1 to 10 mols of the former to 1 mol of the latter. The space velocity of reactants is not critical and may vary from as low as 50 to as much as 2000, or more. Where the reactant is an ethylene dihalide, e.g., ethylene dichloride, ethylene dibromide, ethylene diiodide, chlorobromethane, chloroiodoethane, bromoiodoethane, etc., the product obtained is acrylonitrile when the noble metal catalyst is used. Likewise, the reaction of any of the vinyl halides, vinyl chloride, vinyl iodide, vinyl bromide, etc., with cyanogen (or HCN) in the presence of the above-mentioned noble metal catalysts results in the production of acrylonitrile. The catalyst used in this process is preferably activated alumina for methyl and allyl halides, while alumina containing a small amount (e.g., up to 5%) of rhodium or other platinum group metal is used for reactions which produce acrylonitrile.

While we have described our invention fully and completely, as required by the patent laws, with special emphasis upon several preferred embodiments thereof, we wish it to be understood that within the scope of the appended claims, this invention may be practiced otherwise than as specifically described herein.

The embodiments of the invention in which an exclusive property or privilege is claimed are defined as follows:

1. A method of preparing aliphatic nitriles which comprises reacting a halogenated hydrocarbon selected from the group consisting of $CH_3X$, $XCH_2CH_2X$, $CH_2CHCH_2X$, and $C_2H_3X$, where X is selected from the group consisting of chlorine, bromine, and iodine, with cyanogen, at a halogenated hydrocarbon/cyanogen mol ratio in a range from about 0.1 to 10, at a gaseous hourly space velocity of reactants of about 50–2000, at a temperature of about 400°–1000° C., in the presence of a catalyst selected from the group consisting of activated alumina and activated alumina containing about 0.01–5.0% wt. of a group VIII noble metal.

2. A method according to claim 1 in which the halogenated compound is monohalomethane.

3. A method according to claim 1 which the halogenated compound is an ethylene dihalide.

4. A method according to claim 1 in which the halogenated compound is a vinyl halide.

5. A method according to claim 1 in which the halogenated compound is an allyl halide.

6. A method according to claim 1 in which the catalyst is activated alumina.

7. A method according to claim 1 in which the catalyst is activated alumina containing about 0.01–5.0% wt. of a group VIII noble metal.

8. A method of preparing aliphatic nitriles which comprises reacting a halogenated hydrocarbon selected from the group consisting of $CH_3X$, $XCH_2CH_2X$, $CH_2CHCH_2X$, and $C_2H_3X$, where X is selected from the group consisting of chlorine, bromine and iodine, with hydrogen cyanide, at a halogenated hydrocarbon/hydrogen cyanide mol ratio in a range from about 0.1–10, at a gaseous hourly space velocity of reactants of about 50–2000, at a temperature of about 400°–1000° C., in the presence of a catalyst consisting essentially of activated alumina containing about 0.01–5.0% wt. of a group VIII noble metal.

9. A method of preparing aliphatic nitriles which comprises reacting a halogenated hydrocarbon selected from the group consisting of $CH_3X$, $XCH_2CH_2X$, $CH_2CHCH_2X$, and $C_2H_3X$, where X is selected from the group consisting of chlorine, bromine and iodine, with a cyanide compound selected from the group consisting of hydrogen cyanide and cyanogen, at a halogenated hydrocarbon/cyanide compound mol ratio in a range from about 0.1–10, at a gaseous hourly space velocity of reactants of about 50–2000, at a temperature of about 400°–1000° C., in the presence of a catalyst consisting essentially of activated alumina containing about 0.01–5.0% wt. of a group VIII noble metal.

10. A method of preparing lower aliphatic nitriles which comprises reacting methyl chloride with cyanogen at about 500°–600° C. in the presence of a catalyst consisting essentially of activated alumina, to produce acetonitrile.

11. A method of preparing lower aliphatic nitriles which comprises reacting ethylene dichloride with hydrogen cyanide at about 500°–600° C. in the presence of a catalyst consisting essentially of activated alumina containing 0.01–5.0% wt. of a group VIII noble metal, to produce acrylonitrile.

12. A method of preparing lower aliphatic nitriles which comprises reacting ethylene dichloride with cyanogen at about 500°–600° C. in the presence of a catalyst consisting essentially of activated alumina containing 0.01–5.0% wt. of a group VIII noble metal, to produce acrylonitrile.

13. A method of preparing lower aliphatic nitriles which comprises reacting vinyl chloride with hydrogen cyanide at about 500°–600° C. in the presence of a catalyst consisting essentially of activated alumina containing 0.01–5.0% wt. of a group VIII noble metal, to produce acrylonitrile.

14. A method of preparing lower aliphatic nitriles which comprises reacting vinyl chloride with cyanogen at about 500°–600° C. in the presence of a catalyst consisting essentially of activated alumina containing 0.01–5.0% wt. of a group VIII noble metal, to produce acrylonitrile.

15. A method of preparing nitriles which comprises reacting allyl chloride with cyanogen at about 500°–600° C. in the presence of a catalyst consisting essentially of activated alumina, to produce allyl cyanide.

References Cited in the file of this patent

UNITED STATES PATENTS

| | | |
|---|---|---|
| 2,467,373 | Dutcher et al. | Apr. 19, 1949 |

FOREIGN PATENTS

| | | |
|---|---|---|
| 708,111 | France | July 20, 1931 |